(12) United States Patent
Sparks et al.

(10) Patent No.: US 7,816,000 B2
(45) Date of Patent: Oct. 19, 2010

(54) PLASTIC SHEET OFFERING MATTE APPEARANCE AND METHOD OF PREPARATION

(75) Inventors: Darrell L. Sparks, Kennebunk, ME (US); Grant B. LaFontaine, Kennebunk, ME (US); Jennifer A. Litke, Brooklyn, CT (US); Robert E. Smith, Shapleigh, ME (US)

(73) Assignee: Evonik Cyro, LLC, Parsippany, NJ (US)

( * ) Notice: Subject to any disclaimer, the term of this patent is extended or adjusted under 35 U.S.C. 154(b) by 0 days.

(21) Appl. No.: 12/074,718

(22) Filed: Mar. 4, 2008

(65) Prior Publication Data

US 2008/0226872 A1   Sep. 18, 2008

Related U.S. Application Data

(63) Continuation of application No. 11/194,061, filed on Jul. 29, 2005, which is a continuation-in-part of application No. 09/817,788, filed on Mar. 26, 2001, now abandoned.

(60) Provisional application No. 60/192,057, filed on Mar. 24, 2000.

(51) Int. Cl.
*B32B 27/32* (2006.01)
*B32B 5/16* (2006.01)

(52) U.S. Cl. ............... 428/323; 428/220; 428/332

(58) Field of Classification Search .......... None
See application file for complete search history.

(56) References Cited

U.S. PATENT DOCUMENTS

| | | | |
|---|---|---|---|
| 3,751,326 A | | 8/1973 | Marks |
| 4,464,513 A | | 8/1984 | Kishida et al. |
| 4,876,311 A | | 10/1989 | Hennig et al. |
| 5,318,737 A | * | 6/1994 | Trabert et al. ......... 264/173.16 |
| 6,225,407 B1 | * | 5/2001 | Jacobs et al. ............. 525/70 |
| 6,309,739 B1 | | 10/2001 | Koizumi et al. |
| 6,692,821 B2 | | 2/2004 | Koyama et al. |
| 6,696,140 B2 | | 2/2004 | Suzuki |
| 6,861,129 B2 | | 3/2005 | Reilly et al. |
| 7,067,188 B1 | | 6/2006 | Yang et al. |
| 2002/0027626 A1 | | 3/2002 | Hiraishi et al. |

FOREIGN PATENT DOCUMENTS

| | | |
|---|---|---|
| EP | 0497506 A2 | 8/1992 |
| EP | 0497506 A3 | 8/1992 |
| EP | 1022115 B1 | 1/2000 |

OTHER PUBLICATIONS

Japan 11170449, Jun. 1999.
Hirota Satoru, Acrylic Resin Laminated Sheet Having Crystal-Like Frosted Glass Appearnace, Publication No. 11221882, Aug. 17, 1999, Patent Abstracts of Japan.
Kikuchi Narikazu, Product Having Ground Glass Touch and Manufacture Thereof, Publication No. 11348105, Dec. 19, 1999, Patent Abstracts of Japan.

* cited by examiner

*Primary Examiner*—Sheeba Ahmed
(74) *Attorney, Agent, or Firm*—Klauber & Jackson LLC

(57) ABSTRACT

A plastic sheet product having a matte finish comprises a core layer of a thermoplastic polymer and at least one layer of a capstock composition which overlies, and is bonded to, at least one face of the core layer. The capstock composition comprises the same or different thermoplastic polymer and contains a plurality of discrete particles immiscible with and dispersed in the thermoplastic polymer of the capstock composition. The sheet product may be prepared by the co-extrusion of the thermoplastic polymer and the capstock composition, and in a particular embodiment, such co-extrusion may be conducted by means of a feedblock. In a particular embodiment, the thermoplastic polymer of the core layer and that of the capstock composition may be the same, such as in the instance of a methylmethacrylate-methylacrylate copolymer. Sheet products prepared in accordance with the invention exhibit improved post-processability and ease of surface maintenance, and may be fabricated into a variety of products including light diffusers, projection screens, and the like.

14 Claims, 1 Drawing Sheet

PLASTIC SHEET OFFERING MATTE APPEARANCE AND METHOD OF PREPARATION

CROSS REFERENCE TO RELATED APPLICATIONS

The present application is a continuation of application Ser. No. 11/194,061, filed Jul. 29, 2005, which, in turn, is a continuation-in-part of non-provisional application Ser. No. 09/817,788, filed Mar. 26, 2001, now abandoned which, in turn, is based upon Provisional Application Ser. No. 60/192,057 filed on Mar. 24, 2000. Applicants claim the benefits of 35 U.S.C. §120 as to the said non-provisional application, and 35 U.S.C. §119(e) as to the said provisional application, and the disclosures of both of said applications are incorporated herein in their entireties.

BACKGROUND OF THE INVENTION

1. Field of the Invention

The invention relates to a plastic sheet product exhibiting a matte appearance which comprises a core layer and at least one layer of a capstock composition which overlies and is bonded to at least one face of the core layer, where the capstock composition contains particulate inclusions that yield the desired appearance and that emulates frosted glass.

2. Description of Related Art

It is well known that plastic sheets with a matte finish can be manufactured using textured or embossing calendar rolls. However, such technology has several disadvantages such as frequent replacement of the rolls, limited predictability and consequent uniformity of the textural designs of the sheets produced, loss of the texture if the sheet is thermoformed, and the like.

It is also known to prepare a translucent screen comprising a dispersion of a transparent material in a matrix material in which the refractive index of the transparent material differs slightly from that of the matrix material—see U.S. Pat. No. 2,287,556 and published European Patent Application 0 464 499 A2. It is additionally known to coextrude a matrix layer and one or two layers of a capstock composition containing miscible particles of an impact modifier—see U.S. Pat. No. 5,318,737.

Among the shortcomings of the prior art, the sheet materials presently available offer inconsistencies in appearance and difficulty in preparation, as there are often unacceptable variations in the thickness of the matte layer. Also, in the instance where the finish is achieved by surface texturization, the products are more difficult to maintain and clean.

None of the known technology effectively addresses the shortcomings of the prior art with respect to the preparation and resultant quality of the matte appearance plastic sheeting, and it is toward the preparation of products that do not suffer from these shortcomings that the present invention is directed.

SUMMARY OF THE INVENTION

Figure 1A:
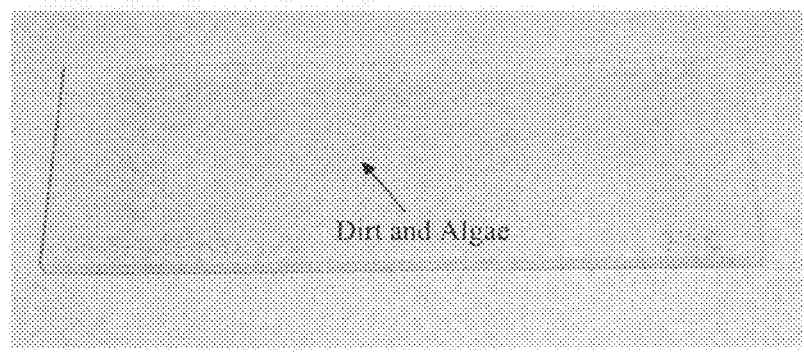
FIGS. 1A and 1B are pictures of an acrylic sheet with a textured cap layer (FIG. 1B) and a textured acrylic sheet produced from a standard manufacturing process (FIG. 1A) after four years of natural weathering in Florida in accordance with ASTM G 7 "Standard Practice for Atmospheric Environmental Exposure Testing of Nonmetallic Materials". The pictures demonstrate that an acrylic sheet with a textured cap layer contains less dirt and algae than the standard textured acrylic sheet. These pictures demonstrate that acrylic sheets with a textured cap layer are less porous and require less cleaning maintenance than standard textured acrylic sheets.
Figure 1B:
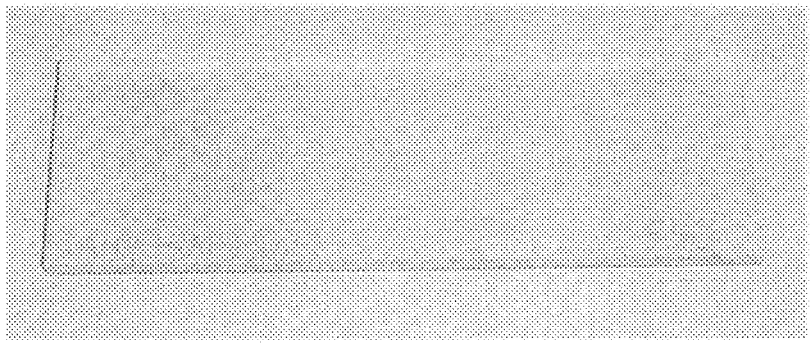

It has now been found that it is possible to inexpensively prepare a plastic sheet product that offers a matte appearance without the aforementioned drawbacks, which sheet product comprises a core layer of a thermoplastic polymer and at least one layer of a capstock composition which provides the matte appearance to the sheet product, and that overlies and is bonded to at least one face of the core layer. The capstock composition comprises a thermoplastic polymer which may be the same or different from the thermoplastic polymer employed for the core layer and will contain a plurality of discrete particles immiscible with, and dispersed in, the capstock thermoplastic polymer. The refractive index of the particles will differ from that of the capstock thermoplastic polymer.

Accordingly, in a first aspect of the invention, the sheets of the invention may be prepared with one or more capping layers, and can be prepared by co-extrusion, with a particular technique employing extrusion through a feed block system. Such parameters as the size and loading of immiscible particles in the capping layer, and the thickness of all layers, may vary within the ranges recited herein as within the scope of the invention, to achieve particular effects in the final manufactured products.

The products of the present invention exhibit a combination of improved properties, among them durability and cleanability, and are useful in a variety of applications where a matte or frosted appearance is desirable, among them, for light diffusers and lighting fixtures, privacy panels such as shower doors, retail displays, and projection screens.

DETAILED DESCRIPTION

For the purposes of the present invention the core layer may consist of a transparent (which is preferred), translucent or opaque first thermoplastic polymer. Suitable examples of the first thermoplastic polymer include polyethylenes, polypropylenes, ethylene-propylene copolymers, ethylene-vinyl acetate copolymers, ethylene-methyl acrylate copolymers, ethylene-ethyl acrylate copolymers, ethylene-methyl methylmethacrylate copolymers, ethylene-vinyl acetate-methyl methacrylate copolymers, polyvinyl chloride, acrylonitrile-styrene copolymers, polystyrenes, styrene-methylmethacrylate copolymers, polyethyl acrylates, polymethyl-methacrylates, methylmethacrylate-methylacrylate copolymers, polyethylene terephthalates, polyamides, polycarbonates, polyurethanes, silicone resins and the like. In the instance where the polymer is an acrylic, the first thermoplastic polymer will typically have a weight average molecular weight of about 100,000 to about 175,000, preferably 125,000 to 150,000.

Preferably, the first thermoplastic polymer comprises a methyl methacrylate-methyl acrylate copolymer wherein the methyl methacrylate is present in the amount of about 80 to about 98 wt. %, preferably 93 to 97 wt. %, and even more preferably 94 to 96 wt. %. The methyl acrylate is present in the amount of about 2 to about 20 wt. %, preferably 3 to 7 wt. %, and even more preferable about 4 to about 6%. The methyl methacrylate-methyl acrylate copolymer may have a melt index of about 1.5 to 5, or 2.0 to 4.0, or even 2.1 to 2.5.

At least one capstock layer may be included with the core layer and will overly and will be bonded to at least one face of the core layer. Thus, the plastic sheet product of the invention may have one capstock layer overlying and bonded to one face of the core layer or it may have two capstock layers with each layer overlying and bonded to each face of the core layer.

The capstock layer composition comprises a second thermoplastic polymer containing a plurality of discrete particles immiscible with, and dispersed in, the polymer. The refractive index of the particles will differ from the refractive index of the second thermoplastic polymer. The second thermoplastic polymer may be any of the thermoplastic polymers listed above in respect to the first thermoplastic polymer. The second thermoplastic polymer may be different from the first thermoplastic polymer. In the latter case, the choices of the first and second thermoplastic polymer should be such that they are sufficiently compatible with one another such that the capstock layer will bond to the face of the core layer, and in one embodiment, is able to so bond when the layers are processed by feedblock coextrusion. In a particular embodiment, the second thermoplastic polymer is the same as the first thermoplastic polymer.

Typically, the core layer will have a thickness of about 2 to 13 mm, more particularly, a thickness of from about 3 to about 10 mm, and even more preferably about 3 to about 8 mm. The capstock layer(s) may have a thickness of from about 10 to about 400 microns, and more particularly, from about 50 to about 300 microns, and even more particularly, from about 100 to about 275 microns.

The particles may be immiscible in the second thermoplastic polymer and will typically be present in the amount of about 4 to about 30 wt. %, or for instance 10 to 30 wt. %, preferably about 18 to about 28 wt. %, and even more preferably 22 to 26 wt. %. The particles may typically have particle size diameters in the range of about 1 micron to about 60 microns, and preferably be from about 20 to about 80 microns, more preferably about 30 to about 50 microns, and even more preferably be from about 35 to about 45 microns, for instance about 40 microns. In some embodiments at least about half of the particles will be greater than about 30 microns and at least about half of the particles will be less than about 50 microns in diameter. In other embodiments, at least about two thirds of the particles will be greater than about 25 microns in diameter. The particles may comprise a polymer or a pigment. Useful examples of such polymers include crosslinked polymethylmethacrylate, crosslinked polymethylmethacrylate modified with an acrylate or methacrylate monomer, crosslinked copolymers of methylmethacrylate and styrene, silicone resins and polyallyl methacrylates. Useful non-limiting examples of such pigments include barium sulfate, silicon dioxide, aluminum oxide, aluminum hydroxide and calcium carbonate.

The second thermoplastic polymer and the particles will typically have refractive indices in the range of about 1.40 to about 1.65, preferably 1.49 to 1.55. The difference in the refractive index values of the particles and the second thermoplastic polymer will typically be in the range of about 0.001 to about 0.050, preferably 0.005 to 0.040, and even more preferably about 0.015 to about 0.035.

The plastic sheet according to the present invention may demonstrate particular Half Angles as measured in degrees and particular Diffusion Factors. The Half Angle is a measure of the angle at which the light intensity is halved. It therefore provides a measurement of how the light is diffusing in the sheet. The Diffusion Factor is obtained by measuring light intensity at three different angles, namely 5°, 20° and 70°. The values are then related by the following formula:

light intensity at 70°+light intensity at 20°×100=Diffusion Factor 2×(light intensity at 5°)

In particular embodiments, the Half Angle is from about 5° to about 10°, preferably from about 7° to about 9°. Additionally the Diffusion Factor may range from about 2 to about 10, preferably about 3 to about 9, and more preferably from about 4 to about 7 (Diffusion Factor determined by ASTM E167).

The plastic sheet according to the present invention may demonstrate particular transmission and haze characteristics. In some embodiments, sheets tested in accordance with the ASTM D 1003 "Test Method for Haze and Luminous Transmittance of Transparent Plastics" using a GretagMacBeth Color Eye-7000A spectrophotometer using Illuminant C and a 2° observer normally demonstrate Transmission of light of at least about 92%, preferably at least about 92.3%, and more preferably, at least about 92.5%. In some embodiments, sheets measured in accordance with ASTM D 523 "Test Method for Specular Gloss" using BYK-Gardner micro-TRI-gloss (20°, 60° and 85°) with a black felt backing may demonstrate gloss at 20° of about 0.5 to 1.0, preferably about 0.6, 0.7 or 0.8. The sheets may demonstrate gloss at 60° of about 5 to about 7, preferably, about 5.2 to about 6.6. The sheets may also demonstrate gloss at 85° of about 1 to about 6, preferably about 2 to about 5.

The following nonlimiting examples are illustrative of the invention. Unless otherwise indicated, all amounts and percentages are on a weight basis.

EXAMPLES

Example 1

In this example, a plastic sheet product containing one capstock layer bonded to the core layer was prepared. The first thermoplastic polymer used for the core layer and the second thermoplastic polymer used for the capstock layer were the same: a copolymer of about 94 wt. % methyl methacrylate and about 6 wt. % methyl acrylate having a melt index of 2.1, a weight average molecular weight of 150,000 and a refractive index of 1.490. The amount of the first thermoplastic composition for the core layer in relation to the second thermoplastic polymer for the capstock layer was such that, after feedblock coextrusion of the two layers, the core layer had a thickness of 5.75 mm and the capstock layer had a thickness of 250 microns. Particles comprising beads of a crosslinked polymethyl methacrylate with a refractive index of 1.52 and average particle diameters of about 40 microns were combined with the second thermoplastic polymer in an amount of 25 wt. % of the beads.

The equipment used to coextrude streams of the core layer composition and the capstock layer composition was a conventional extruder equipped with means to melt and pump the two streams. A conventional combining feedblock combined the streams in molten form as they exited the extruders and thereafter the streams were fed into a conventional single-manifold sheet die and then exited onto conventional multi-roll polishing units cooling racks and pull rolls. In this example, only one capstock layer was bonded to one face of the core layer and therefore, the flow channel on one side of the feedblock was closed off so that the capstock layer could flow to only one side of the core layer.

The equipment was heated to provide a melt temperature of 255° C. and the extrusion process is started. Once the flow is established through the die. the sheet line is strung up in the typical manner with speeds gradually increased to the desired production rate which typically is in the range of 200 to 5,000 pounds per hour.

Example 2

Example 1 was repeated so as to prepare a plastic sheet product with capstock layers on both faces of the core layer and a total thickness of about 6 mm. Accordingly, the composition of the core layer and the capstock layer were the same as those of Example 1, and the general manufacturing procedure was also the same, with the exception that the flow channels on both sides of the feed block were opened so that the capstock layer composition could flow to both faces of the core layer. The amount of the first thermoplastic composition for the core layer in relation to the second thermoplastic polymers for each capstock layer was such that, after feedblock coextrusion of the three layers was complete, the core layer had a thickness of 5.5 mm and each capstock layer had a thickness of 250 microns.

Example 3

In this example, as in Example 1, plastic sheet products containing one capstock layer bonded to the core layer were prepared. The first thermoplastic polymer used for the core layer and the second thermoplastic polymer used for the capstock layer were the same: a copolymer of about 94 wt. % methyl methacrylate and about 6 wt. % methyl acrylate having a melt index of 2.1, a weight average molecular weight of 150,000 and a refractive index of 1.490. The amount of the first thermoplastic composition for the core layer in relation to the second thermoplastic polymer for the capstock layer was such that, after feedblock coextrusion of the two layers, the core layer had a thickness of between about 2 and about 9 mm as reflected in Table 1, and the capstock layer had a thickness of between about 125 and 195 microns as reflected in Table 1. Particles comprising beads of a crosslinked polymethyl methacrylate with a refractive index of about 1.52 and average particle diameters of about 40 microns may be combined with the second thermoplastic polymer in an amount of about 25 wt. % of the beads.

The equipment used to coextrude streams of the core layer composition and the capstock layer composition was a conventional extruder equipped with means to melt and pump the two streams. A conventional combining feedblock combined the streams in molten form as they exited the extruders and thereafter the streams were fed into a conventional single-manifold sheet die and then exited onto conventional multi-roll polishing units cooling racks and pull rolls. In this example, only one capstock layer was bonded to one face of the core layer and therefore, the flow channel on one side of the feedblock was closed off so that the capstock layer could flow to only one side of the core layer.

The equipment was heated to provide a melt temperature of 255° C. and the extrusion process is started. Once the flow is established through the die. the sheet line is strung up in the typical manner with speeds gradually increased to the desired production rate which typically is in the range of 200 to 5,000 pounds per hour.

TABLE 1

| | | Thickness (mm) | | | | | | | | | |
|---|---|---|---|---|---|---|---|---|---|---|---|
| | 3 | 3 | 6 | 6 | 6 | 6 | 6 | 9 | 9 | 9 | 9 |
| | | | | | | Color | | | | | |
| | 0917-9 | 0917-9 | 0917-9 | 0917-9 | 0917-9 | 0917-9 | 0917-9 | 0917-9 | 0917-9 | 5169-8 | 5169-8 |
| | | | | | | Skid | | | | | |
| | 1298 | 1299 | 1307 | 1308 | 1309 | 1310 | 1311 | 1316 | 1324 | 1325 | 1326 |
| Cap thickness (microns) across sheet | 175 | 175 | 314 | 255 | 295 | 286 | 263 | 376 | 341 | 370 | 390 |
| | 190 | 166 | 260 | 287 | 320 | 290 | 261 | 355 | 325 | 354 | 435 |
| | 195 | 172 | 270 | 240 | 339 | 287 | 289 | 312 | 308 | 317 | 422 |
| | 185 | 159 | 235 | 231 | 315 | 237 | 251 | 323 | 269 | 286 | 390 |
| | 171 | 165 | 224 | 220 | 282 | 216 | 230 | 260 | 263 | 280 | 371 |
| | 155 | 137 | 210 | 214 | 299 | 205 | 213 | 263 | 245 | 238 | 323 |
| | 145 | 138 | 218 | 208 | 250 | 218 | 219 | 231 | 266 | 239 | 293 |
| | 139 | 148 | 242 | 205 | 245 | 232 | 220 | 268 | 231 | 234 | 288 |
| | 140 | 130 | 211 | 195 | 207 | 212 | 206 | 249 | 240 | 251 | 291 |
| | 125 | 132 | 201 | 198 | 198 | 179 | 208 | 240 | 255 | 224 | 262 |
| | 145 | 123 | 233 | 196 | 200 | 192 | 204 | 233 | 228 | 205 | 265 |
| | 125 | 112 | 201 | 168 | 170 | 177 | 195 | 255 | 234 | 215 | 238 |
| | 122 | 135 | 212 | 184 | 158 | 181 | 201 | 240 | 223 | 243 | 233 |
| | 140 | 144 | 199 | 205 | 177 | 190 | 215 | 246 | 264 | 247 | 231 |
| | 131 | 127 | 224 | 215 | 193 | 210 | 236 | 267 | 265 | 253 | 222 |
| | 130 | 130 | 242 | 220 | 184 | 212 | 230 | 293 | 269 | 272 | 240 |
| | 135 | 124 | 235 | 245 | 205 | 225 | 241 | 281 | 307 | 293 | 235 |
| | 131 | 127 | 268 | 263 | 212 | 223 | 247 | 305 | 317 | 293 | 256 |
| | 129 | 122 | 280 | 282 | 190 | 237 | 278 | 336 | 338 | 317 | 232 |
| | 133 | 121 | 285 | 292 | 220 | 265 | 274 | 348 | 349 | 375 | 239 |
| | 147 | 157 | 310 | 299 | 250 | 301 | 311 | 395 | 390 | 375 | 276 |
| | 146 | 158 | 336 | 297 | 248 | 314 | 306 | 390 | 402 | 428 | 325 |
| | 149 | 160 | 333 | 302 | 256 | 298 | 331 | 429 | 386 | 407 | 345 |
| | 145 | 146 | 298 | 291 | 301 | 290 | 312 | 416 | 408 | 373 | 335 |
| Average (microns) | 147.0 | 142.0 | 251.7 | 238.0 | 238.1 | 236.5 | 247.5 | 304.6 | 296.8 | 295.4 | 297.4 |
| St.Dev | 20.67 | 17.79 | 42.02 | 40.95 | 51.87 | 42.60 | 39.30 | 61.00 | 57.63 | 64.03 | 64.35 |
| Maximum | 195 | 175 | 336 | 302 | 339 | 314 | 331 | 429 | 408 | 428 | 435 |
| Minimum | 122 | 112 | 199 | 168 | 158 | 177 | 195 | 231 | 223 | 205 | 222 |
| Range | 73 | 63 | 137 | 134 | 181 | 137 | 136 | 198 | 185 | 223 | 213 |

TABLE 1-continued

| | Thickness (mm) | | | | | | | | | |
|---|---|---|---|---|---|---|---|---|---|---|
| 3 | 3 | 6 | 6 | 6 | 6 | 6 | 9 | 9 | 9 | 9 |
| | | | | | Color | | | | | |
| 0917-9 | 0917-9 | 0917-9 | 0917-9 | 0917-9 | 0917-9 Skid | 0917-9 | 0917-9 | 0917-9 | 5169-8 | 5169-8 |
| 1298 | 1299 | 1307 | 1308 | 1309 | 1310 | 1311 | 1316 | 1324 | 1325 | 1326 |
| Total thickness (mm) 2.85 | 2.85 | 5.85 | 5.85 | 5.85 | 5.85 | 5.85 | 8.85 | 8.85 | 8.85 | |
| Cap (mm) 0.147 | 0.142 | 0.252 | 0.238 | 0.238 | 0.237 | 0.248 | 0.305 | 0.297 | 0.295 | |

Example 4

In this example, a comparison was made as to gloss, haze and transmission as between a sheet product having a cap layer with a bead loading of 12% and that of a product having a bead loading of 25%. Accordingly, Example 1 was repeated so as to prepare a plastic sheet product with a capstock on only one side, but with the capstock containing only 12% of the crosslinked PMMA bead particles. The composition and size of the beads was the same as in Example 1. This example produced a sheet product with higher gloss values (6.6% versus 0.7% at 20°), lower haze (43% versus 86.5%), but similar light transmission values (91.7% versus 92.5%) to the product in Example 1. The product in this example visually had a less consistent surface appearance than the material in Example 1.

Example 5

In this experiment abrasion resistance was compared between standard polished acrylic sheets and standard texture acrylic sheet and acrylic sheet with a textured capstock layer. Acrylic sheets with a textured cap layer provide better abrasion resistance than acrylic sheets, polished and textured, which are produced from standard manufacturing processes. Samples of standard polished acrylic sheet, standard texture acrylic sheet and acrylic sheet with a textured cap layer with various loadings of beads approximately 40 microns in diameter were tested in accordance with DIN 52 348 "Resistance to Falling Sand". The test measures the change in haze and gloss at 60° after the samples have been subjected to 3000 g of falling sand in diameters 0.5-0.7 mm. A lower change in haze and gloss value indicates better abrasion resistance properties. Table 2 summarizes the abrasion resistance. The results show that acrylic sheets with a textured cap layer having 12% and 25% weight percent particles produce a lower change in haze and gloss. These results indicate that acrylic sheets with a textured cap layer provide better abrasion resistance than polished and textured acrylic sheets manufactured through standard processes.

TABLE 2

| Sheet Material | Change in Haze (%) | Change in Gloss (60°) |
|---|---|---|
| Standard polished acrylic sheet (ACRYLITE ® FF) | 30.9 | 89.9 |
| Standard textured acrylic sheet (ACRYLITE ® FF P-99) | 27.1 | 64.1 |
| Textured cap layer acrylic sheet with 12% bead loading (ACRYLITE ® FF Crystal Ice) | 8.72 | 8.0 |

TABLE 2-continued

| Sheet Material | Change in Haze (%) | Change in Gloss (60°) |
|---|---|---|
| Textured cap layer acrylic sheet with 25% bead loading (ACRYLITE ® FF Crystal Ice) | 0.75 | 0.7 |

Example 6

In this experiment abrasion resistance was determined in relation to weight percent of beads in capstock layer. The abrasion resistance properties of an acrylic sheet with a textured capstock layer varies with the weight percent of beads present in the capstock layer. Acrylic sheets with a textured capstock layer having various weight percentages of beads measuring approximately 5 microns in diameter were tested in accordance with DIN 52 348 "Resistance to Falling Sand". The samples were measured for a change in 60° gloss after being subjected to 3000 kg of sand. Table 3 summarizes the change in gloss with various bead loadings. The results demonstrate that as the weight percentage of beads is increased to 10%, the abrasion resistance of the sheet improves dramatically. However, the results also show that the abrasion resistance properties of the material do not continually improve when the bead loading exceeds 10%.

TABLE 3

| Bead Loading | Change in 60° Gloss |
|---|---|
| 5% | 24.5 |
| 10% | 6.5 |
| 15% | 4.8 |
| 20% | 4.7 |

Example 7

In this experiment, abrasion resistance was determined in relation to capstock layer thickness. The thickness of the capstock layer also affects the abrasion resistant properties of the sheet. Samples with various capstock layer thicknesses of 40 micron diameter beads were measured for abrasion resistance in accordance with CYRO's steel wool rotary test. The test consisted of rotating "0000" fine steel wool on a sample under a weight of 37 lbs for 100 revolutions. Samples were measured for haze before and after steel wool abrasion. The results are reported as a change in haze. A higher change in haze value indicates lower abrasion resistance. Table 4 summarizes the abrasion resistance of the ACRYLITE FF Crystal Ice acrylic sheet. The results show that as the thickness of the cap layer increases, the change in haze decreases. These results indicate that the abrasion resistance of the sheet improves as the thickness of the cap layer increases.

TABLE 4

| Cap Layer Thickness (microns) | Change in Haze (%) |
|---|---|
| 100 | 19.96 |
| 186 | 8.22 |
| 235 | 6.72 |
| 509 | 1.41 |

Example 8

In this experiment, optical properties were compared. Samples were tested in accordance with the ASTM D 1003 "Test Method for Haze and Luminous Transmittance of Transparent Plastics" using a GretagMacBeth Color Eye-7000A spectrophotometer using Illuminant C and a 2° observer. Samples were also measured in accordance with ASTM D 523 "Test Method for Specular Gloss" using BYK-Gardner micro-TRI-gloss (20°, 60° and 85°) with a black felt backing. Table 5 summarizes the optical properties. The results demonstrate that acrylic sheets with a textured capstock layer produce lower gloss values than acrylic sheets, polished and textured, produced by standard manufacturing processes. The results also demonstrate that acrylic sheets with a textured cap layer having 25% weight percent beads produce more consistent gloss readings within a large range of thicknesses than textured acrylic sheets manufactured from standard processes. Capstock layers having approximately 40 micron diameter beads produce lower gloss values than capstock layers having approximately 5 micron diameter beads.

TABLE 5

| Sheet Material | Thickness (mm) | Transmission (%) | Haze (%) | Gloss 20° | 60° | 85° |
|---|---|---|---|---|---|---|
| Standard polished acrylic sheet | 3 | 92.3 | 0.18 | 152 | 147 | 117 |
| Standard textured acrylic sheet | 3 | 92.0 | 1.58 | 79.1 | 115 | 92.2 |
| Standard textured acrylic sheet | 6 | 91.7 | 2.18 | 73.8 | 107 | 94.9 |
| 12% 40 micron beads in cap layer | 3 | 91.7 | 43.0 | 6.6 | 24.0 | 14.2 |
| 25% 40 micron beads in cap layer | 3 | 92.5 | 86.5 | 0.7 | 6.6 | 1.6 |
| 25% 40 micron beads in cap layer | 4.5 | 92.5 | 90.5 | 0.6 | 5.2 | 2.0 |
| 25% 40 micron beads in cap layer | 6 | 92.8 | 90.6 | 0.8 | 5.7 | 2.7 |
| 25% 40 micron beads in cap layer | 9 | 92.3 | 89.8 | 0.8 | 6.3 | 5.1 |
| 5% 5 micron beads in cap layer | 6 | 89.2 | 90.3 | 12.6 | 49.5 | 76.0 |
| 10% 5 micron beads in cap layer | 6 | 87.5 | 95.5 | 2.1 | 16.6 | 33.5 |
| 15% 5 micron beads in cap layer | 6 | 83.8 | 97.0 | 2.1 | 15.3 | 36.1 |
| 20% 5 micron beads in cap layer | 6 | 81.5 | 97.5 | 1.6 | 13.1 | 32.0 |

Example 9

Haze and Gloss were calculated for various capstock layers made according to Example 2 and described in Table 6. The capstock layers contained 5 micron diameter beads having a refractive index of 1.54. A BYK-Gardner TCS-35 Spectrophotometer was used for light transmission and to measure Haze. A BYK-Gardner Micro-Tri-Gloss Gloss Meter was used for Gloss measurements. The results are set forth in Table 6.

TABLE 6

5 micron, 1.54 rf beads

| Sample ID (beads in weight %) | Light Transmission (texture in) % | Light Transmission (texture out) % | % Y Haze (texture in) | % Y Haze (texture out) | 20° Gloss | 60° Gloss | 85° Gloss |
|---|---|---|---|---|---|---|---|
| Crystal Ice | 87.52 | 88.85 | 78.02 | 79.06 | 1.1 | 10.9 | 5.0 |
| 20% beads | 81.74 | 81.54 | 97.35 | 97.46 | 3.1 | 20.1 | 31.4 |
| 15% beads | 84.15 | 83.82 | 96.88 | 96.96 | 3.3 | 24.7 | 37.3 |
| 10% beads | 87.13 | 87.49 | 95.31 | 95.48 | 2.9 | 21.8 | 30.3 |
| 5% beads | 89.27 | 89.20 | 89.93 | 90.33 | 9.0 | 41.6 | 64.7 |

These data demonstrate that the weight percent of beads in the capstock layer affects gloss values rather dramatically with relatively less effects on haze.

Example 10

For lighting fixtures, light diffusers and projection screens, Diffusion Factor and Half Angle measurements are important. In this experiment, Diffusion Factor and Half Angle measurements were calculated for various sheets made according to Example 2 and described in Table 1. The total sheet thickness ranged from about 3 mm to about 6 mm, and the capstock layer thickness ranged from about 102 to about 330 microns as set forth in Table 7. The capstock layers contained either 5 or 40 micron diameter beads having a refractive index of 1.54 or 1.52 respectively. Diffusion Factor and Half angle measurements were performed with a device made at Cyro Industries. Commercial equipment is available, but the Cyro device is a simplified version built in house. The Cyro device consists of a variable power light source (Dolan-Jenner, Fiber-Lite PL900 Illuminator), fiber optic light guide, light meter (Minolta LS 100 Luminance Meter) and optical element bars, mounting hardware and protractor rotating base to mount the various parts on. The equipment is arranged such that the angle of the light source can easily be adjusted, and the sample with respect to the light meter may be adjusted to measure light intensities at the surface of the sample to be measured at various angles. The results are set forth in Table 7.

The Half Angle is a measure of the angle at which the light intensity is halved. It therefore provides a measurement of how the light is diffusing in the sheet. The Diffusion Factor is obtained by measuring light intensity at three different angles, namely 5°, 20° and 70°. The values are then related by the following formula:

TABLE 7

Diffusion Factor and Half Angle Measurements for Various Cap Layered Materials All based on acrylic

| Sample | Bead Size (micron) | % Beads in Cap | Bead Ref Index | Sheet Thickness | Cap Thickness (microns) | Half Angle (°) | Diffusion Factor |
|---|---|---|---|---|---|---|---|
| 1 | 5 | 5 | 1.54 | 6 mm | 200 | 10.0 | 9.8 |
| 2 | 5 | 10 | 1.54 | 6 mm | 330 | 30.0 | 42.7 |
| 3 | 5 | 15 | 1.54 | 6 mm | 210 | 24.0 | 34.3 |
| 4 | 5 | 20 | 1.54 | 6 mm | 204 | 43.0 | 54.3 |
| 5 | 40 | 25 | 1.52 | 6 mm | 174 | 7.0 | 3.7 |
| 6 | 40 | 25 | 1.52 | 4.5 mm | 195 | 9.0 | 6.8 |
| 7 | 40 | 25 | 1.52 | 3 mm | 125 | 8.0 | 6.1 |
| 8 | 40 | 12 | 1.52 | 3 mm | 102 | 1.8 | 1.2 |

$$\frac{\text{light intensity at } 70° + \text{light intensity at } 20°}{2 \times (\text{light intensity at } 5°)} \times 100 = \text{Diffusion Factor}$$

These results demonstrate that the effect of bead size and concentration as well as cap layer thickness on light diffusion for applications such as light diffusing panels and screens.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A plastic sheet product having a textured matte finish and improved abrasion resistance and weathering comprising a core layer of a first thermoplastic polymer and at least one layer of a capstock composition overlying and bonded to at least one face of the core layer, said capstock composition comprising a second thermoplastic polymer and containing a plurality of discrete particles immiscible with, and dispersed in, the second thermoplastic polymer, the discrete particles having a diameter between 20 and 80 microns, and being dispersed in the second thermoplastic polymer in an amount of about 1 to about 30% by weight, and said capstock composition having a thickness of from 150 to 400 microns.

2. The plastic sheet product of claim 1 wherein the particles are dispersed in the second thermoplastic polymer in an amount of 22 to 26% by weight.

3. The plastic sheet product of claim 1 wherein the particles have particle size diameters in the range of 30 to 50 microns.

4. The plastic sheet product of claim 1 wherein the particles are dispersed in the second thermoplastic polymer in an amount of about 22 to about 26% by weight.

5. The plastic sheet product of claim 1 wherein the refractive indices of the particles and the second thermoplastic polymer are in the range of about 1.49 to about 1.55.

6. The plastic sheet product of claim 1 wherein the refractive index of the particles differs from the refractive index of the second thermoplastic polymer by a value in the range of about 0.001 to about 0.030.

7. The plastic sheet product of claim 6 wherein the refractive index of the particles differs from the refractive index of the second thermoplastic polymer by a value in the range of 0.005 to 0.020.

8. The plastic sheet product of claim 6 wherein the difference in the refractive index values of the particles and the second thermoplastic polymer is about 0.015 to about 0.035.

9. The plastic sheet product of claim 1 having a Half Angle of from about 5° to about 10°.

10. The plastic sheet product of claim 1 having a Half Angle of from about 7° to about 9°.

11. The plastic sheet product of claim 1 having a Diffusion Factor ranging from about 3 to about 9.

12. The plastic sheet product of claim 11 having a Diffusion Factor ranging from about 4 to about 7.

13. The plastic sheet product of claim 1 that when tested in accordance with the ASTM D 1003 "Test Method for Haze and Luminous Transmittance of Transparent Plastics" using a GretagMacBeth Color Eye-7000A spectrophotometer using Illuminant C and a 2° observer demonstrates transmission of light of at least about 92%.

14. The plastic sheet product of claim 1 that when tested in accordance with the ASTM D 523 "Test Method for Specular Gloss" using BYK-Gardner micro-TRI-gloss (20°, 60° and 85°) with a black felt backing demonstrates gloss at 20° of about 0.5 to 1.0, demonstrates gloss at 60° of about 5 to about 7, and demonstrates gloss at 85° of about 1 to about 6.

* * * * *